United States Patent [19]

Inui

[11] Patent Number: 5,101,678
[45] Date of Patent: Apr. 7, 1992

[54] COUPLING DEVICE FOR POWER TRANSFER

[75] Inventor: Masaki Inui, Toyota, Japan

[73] Assignee: Toyota Jidosha Kabushiki Kaisha, Toyota, Japan

[21] Appl. No.: 663,754

[22] Filed: Mar. 1, 1991

Related U.S. Application Data

[63] Continuation of Ser. No. 455,008, Dec. 22, 1989, abandoned.

[30] Foreign Application Priority Data

Dec. 23, 1988 [JP] Japan .................. 63-327340

[51] Int. Cl.⁵ .................. F16H 1/10; B60K 17/26; F16D 41/00
[52] U.S. Cl. .................. 74/390; 74/413; 475/162
[58] Field of Search .................. 192/41 R, 46; 74/390, 74/413; 475/162; 180/383

[56] References Cited

U.S. PATENT DOCUMENTS

| | | | |
|---|---|---|---|
| 337,021 | 3/1886 | Scott | 192/41 R |
| 511,169 | 12/1893 | Snider | 74/413 |
| 611,329 | 9/1898 | Lindsay | 74/413 |
| 612,360 | 10/1898 | Lindsay | 74/390 |
| 1,427,584 | 8/1922 | Denison | 74/390 |
| 1,836,587 | 12/1931 | Godfrey | 475/162 X |
| 2,372,310 | 3/1945 | Bowers et al. | 192/61 |

FOREIGN PATENT DOCUMENTS

| | | |
|---|---|---|
| 907228 | 3/1954 | Fed. Rep. of Germany . |
| 960772 | 3/1957 | Fed. Rep. of Germany . |
| 3508663 | 9/1986 | Fed. Rep. of Germany . |
| 385181 | 5/1908 | France . |
| 63-240429 | 10/1988 | Japan . |
| 2142992 | 1/1985 | United Kingdom .. |

Primary Examiner—Richard Lorence
Attorney, Agent, or Firm—Oblon, Spivak, McClelland, Maier & Neustadt

[57] ABSTRACT

A coupling device for power transfer between drive and driven shafts coaxially arranged with each other for relative rotation, which includes an inner member mounted on one end of the drive shaft for rotation therewith and having an eccentric cylindrical support portion the central axis of which is radially displaced from the central axis of the drive shaft, an outer cylindrical casing coaxially connected to one end of the driven shaft for rotation therewith and being arranged in surrounding relationship with the support portion of the inner member, the casing having a number of internal teeth formed therein, an inscribed gear rotatably carried by the support portion of the inner member and being in meshing engagement with the internal teeth of the casing to transfer the power only from the drive shaft to the driven shaft in response to the difference in rotational speed between the shafts, and a separator rotatably carried by the support portion of the inner member and having a guide portion disposed between a portion of the external teeth and a portion of the internal teeth to maintain the meshing engagement of the external teeth with the internal teeth at their other portions.

4 Claims, 2 Drawing Sheets

COUPLING DEVICE FOR POWER TRANSFER

This application is a continuation of application Ser. No. 07/455,008, filed Dec. 22, 1989, now abandoned.

BACKGROUND OF THE INVENTION

1. Field of the Invention

The present invention relates to a coupling device for power transfer between drive and driven shafts coaxially arranged with each other for relative rotation, and more particularly to a coupling device for transmitting the power from the drive shaft to the driven shaft in response to the difference in rotational speed between the shafts.

2. Description of the Prior Art

In Japanese Utility Model Early Publication No. 59-188731, there is disclosed a viscous coupling device wherein an amount of high viscous fluid is stored to effect power transfer between drive and driven shafts when it has been sheared due to the difference in rotational speed between of the shafts. Disclosed in Japanese Patent Early Publication No. 63-240429 is a viscous coupling device which includes a friction clutch for effecting power transfer between drive and driven shafts when it has been engaged. The friction clutch is arranged to be engaged by a pressure of high viscous fluid applied thereto in response to the difference in rotational speed between the shafts. In such conventional viscous coupling devices, the power is transmitted from the drive shaft to the driven shaft and vice versa. In application to the drive system of a four-wheel drive vehicle, however, it is required to prevent transfer of the drive torque from the driven shaft to the drive shaft.

SUMMARY OF THE INVENTION

It is therefore, an object of the present invention to provide a coupling device capable of unidirectionally transmitting the power only from the drive shaft to the driven shaft in response to the difference in rotational speed between the shafts and of preventing transfer of the drive torque from the driven shaft to the drive shaft.

Another object of the present invention is to provide a coupling device suitable for use in the drive system of a four-wheel drive vehicle as a differential, a differential locking mechanism or a limited-slip differential.

According to the present invention, the objects are attained by providing a coupling device for power transfer between drive and driven shafts coaxially arranged with each other for relative rotation, which comprises an inner member in the form of an inner shaft mounted on one end of the drive shaft for rotation therewith and having an eccentric cylindrical support portion the central axis of which is radially displaced from the central axis of the drive shaft, an outer cylindrical casing coaxially connected to one end of the driven shaft for rotation therewith and being arranged in surrounding relationship with the eccentric cylindrical support portion of the inner member, an intermediate rotary member rotatably carried by the eccentric cylindrical support portion of the inner member and being drivingly engaged with an internal surface of the cylindrical casing, and means for maintaining the engagement of the rotary member with the internal surface of the casing.

In a practical embodiment of the present invention, it is preferable that the cylindrical casing is formed therein with a number of internal teeth, the intermediate rotary member is in the form of an inscribed gear formed thereon with a number of external teeth in meshing engagement with the internal teeth of the casing, and the means for maintaining the engagement of the rotary member with the internal surface of the casing is in the form of a separator having an annular flange rotatably carried by the eccentric cylindrical support portion of the inner member and a guide portion of semi-circular cross-section extending perpendicularly from an outer periphery of the annular flange and disposed between a portion of the external teeth and a portion of the internal teeth to maintain the meshing engagement of the external teeth with the internal teeth at their other portions.

BRIEF DESCRIPTION OF THE DRAWINGS

Other objects, features and advantages of the present invention will be readily appreciated from the following detailed description of a preferred embodiment thereof when taken together with the accompanying drawings, in which.

DESCRIPTION OF THE PREFERRED EMBODIMENT

Figures 1, 2:
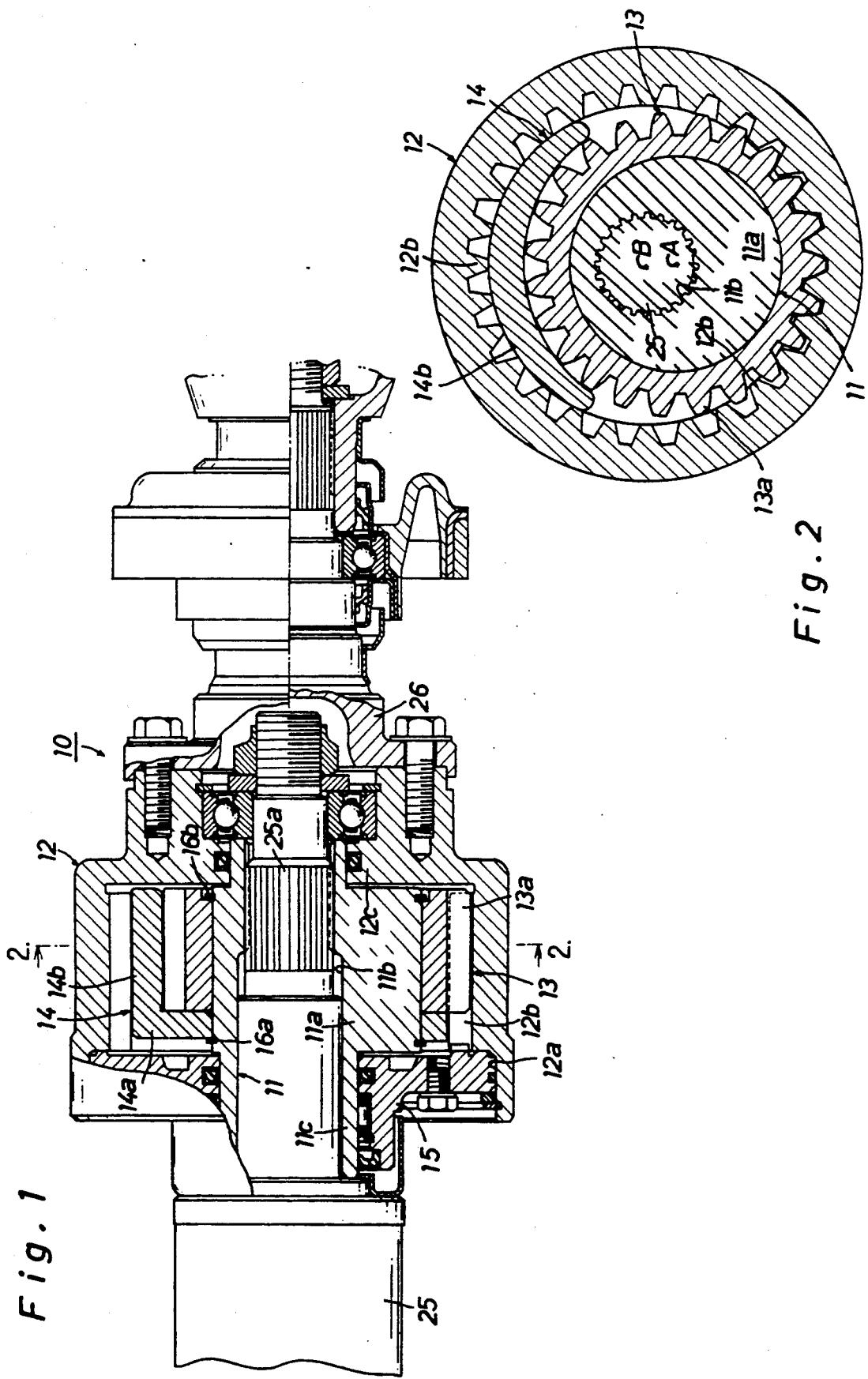
FIG. 1 is a sectional view of a coupling device in accordance with the present invention.
FIG. 2 is a cross-sectional view taken along line II—II in FIG. 1.
Figure 3:
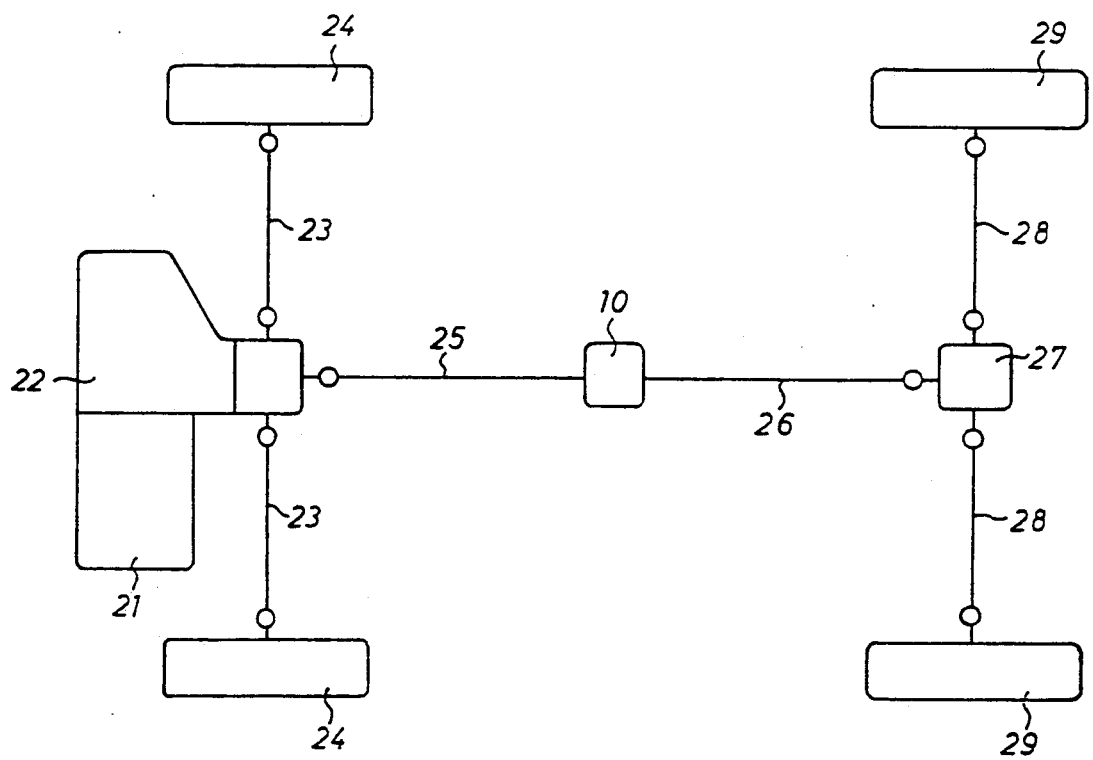
FIG. 3 is a schematic illustration of the drive system of a four-wheel drive vehicle equipped with the coupling device shown in FIGS. 1 and 2.

Referring now to the drawings, FIG. 1 illustrates a preferred embodiment of a coupling device 10 in accordance with the present invention. As shown in FIG. 3, the coupling device 10 is disposed in the rear-wheel drive system of a four-wheel drive vehicle which is equipped with a transaxle 22 including a power transmission assembled with a prime engine 21 and a transfer device united with the power transmission. The transfer device is arranged to transfer the power from prime engine 21 to a set of front road wheels 24, 24 through a pair of split axle shafts 23, 23 and to a front propeller shaft 25 drivingly connected to a rear propeller shaft 26 by means of the coupling device 10. The rear propeller shaft 26 is drivingly connected to a rear differential 27 which acts to transmit the power from propeller shaft 26 to a set of rear road wheels 29, 29 through a pair of split axle shafts 28, 28.

As shown in FIGS. 1 and 2, the coupling device 10 includes, as main component parts, an inner shaft 11, an outer cylindrical casing 12, an inscribed gear 13 and a separator 14. The inner shaft 11 has an eccentric cylindrical support portion 11a of large diameter, an internally splined bore 11b, and a sleeve portion 11c of small diameter. The eccentric cylindrical support portion 11a of shaft 11 has a central axis A radially displaced from the center of internally splined bore 11b. The inner shaft 11 is mounted on an externally splined rear end 25a of the front propeller shaft 25 for rotation therewith in such a manner that the central axis A of eccentric cylindrical support portion 11a is radially displaced from the central axis B of propeller shaft 25. The outer cylindrical casing 12 has a closed end 12c connected to a front end of the rear propeller shaft 26 for rotation therewith and an open end 12a which is closed by a cover member 15 in a fluid-tight manner. The rear end 25a of front propeller shaft 25 is rotatably carried by the closed end 12c of casing 12 through a ball bearing, and the cover member 15 is rotatably supported on the sleeve portion 11c of inner shaft 11 through a needle bearing in a fluid-tight manner. The outer cylindrical casing 12 is formed therein with a number of internal teeth 12b which are arranged in surrounding relationship with the eccentric cylindrical support portion 11a of inner shaft 11.

The inscribed gear 13 is formed thereon with a number of external teeth 13a the outer diameter of which is smaller than the inner diameter of casing 12. The inscribed gear 13 is rotatably carried by the eccentric cylindrical support portion 11a of inner shaft 11 and is positioned in an axial direction by means of a pair of axially spaced snap rings 16a, 16b through an annular flange 14a of separator 14. As shown in FIG. 2, the separator 14 has a guide portion 14b of semi-circular cross-section extending perpendicularly from an outer periphery of annular flange 14a and is rotatably supported on the eccentric cylindrical support portion 11a of inner shaft 11 at its annular flange 14a for rotation therewith. The annular flange 14a of separator 14 is positioned in an axial direction by means of the snap rings 16a, 16b through the inscribed gear 13, and the guide portion 14b of separator 14 is disposed between the internal teeth 12b of casing 12 and the external teeth 13a of inscribed gear 13. In this arrangement, the guide portion 14b of separator 14 is substantially symmetric with the line L passing through central axes A and B, as seen in FIG. 2. It is in contact with a portion of the external teeth 13a at its inner surface so that the other portion of external teeth 13a is maintained in meshing engagement with a portion of the internal teeth 12b of casing 12.

In operation, the inner shaft 11 rotates about the central axis B of front propeller shaft 25 when applied with the power from the prime engine 21 through the transaxle 22 and front propeller shaft 25 in either of two rotational directions. The rotation of inner shaft 11 causes the inscribed gear 13 to rotate with the eccentric cylindrical support portion 11a of inner shaft 11. Thus, the outer cylindrical casing 12 is driven by rotation of the inscribed gear 13 in meshing engagement therewith to rotate the rear propeller shaft 26, and in turn, the rear differential 27 is driven by rotation of the rear propeller shaft 26 to drive the rear road wheels 29, 29 through split axle shafts 28, 28 for four-wheel drive. Assuming that the rear propeller shaft 26 has been driven by a drive torque applied thereto from the rear road wheels 29 through rear differential 27 during travel of the vehicle, the rotational speed of rear propeller shaft 26 becomes higher than that of front propeller shaft 25. In this instance, relative rotation of the cylindrical casing 12 to the front propeller shaft 25 causes the inscribed gear 13 to freely rotate about the cylindrical support portion 11a of inner shaft 11. Thus, the coupling device 10 acts to prevent transfer of the drive torque from the rear propeller shaft 26 to the front propeller shaft 25.

From the above description, it will be understood that the coupling device 10 can be assembled in a simple manner and constructed small in size. In the coupling device 10, the external teeth 13a of inscribed gear 13 are maintained in meshing engagement with the internal teeth 12b of casing 12 to transfer the power from the front propeller shaft 25 to the rear propeller shaft 26. This is effective to eliminate the occurrence of high heat in the coupling device 10 and to ensure the power transfer from the front propeller shaft 25 to the rear propeller shaft 26 without causing undesired influences to the driving performance of the vehicle.

Although a certain specific embodiment of the present invention has been shown and described, it is obvious that many modifications and variations thereof are possible in light of these teachings. For example, the internal teeth 12b of casing 12 may be eliminated for frictional engagement with an intermediate rotary member substituted for the inscribed gear 13. Accordingly, it is to be understood that within the scope of the appended claims, the invention may be practiced otherwise than as specifically described herein.

What is claimed is:

1. In a vehicle having a prime engine driving a drive shaft, and at least one road wheel driven by a driven shaft, a coupling device connected between said drive and driven shafts for unidirectionally transferring power from said drive shaft to said driven shaft comprising:

an inner member mounted on one end of the drive shaft for rotation therewith and having an eccentric cylindrical support portion, the central axis of which is radially displaced from the central axis of the drive shaft;

an outer cylindrical casing coaxially connected to one end of the driven shaft for rotation therewith and being arranged in surrounding relationship with the eccentric cylindrical support portion of said inner member;

an intermediate rotary member freely rotatably carried by the eccentric cylindrical support portion of said inner member and being drivingly engaged with an internal surface of said cylindrical casing; and means for maintaining the engagement of said rotary member with the internal surface of said casing, including a guide portion of semi-circular cross section rotatably carried by the eccentric cylindrical support portion of said inner member for rotation therewith and disposed between an outer portion of said intermediate rotary member and a portion of the internal surface of said cylindrical casing, whereby said inner member rotates said intermediate member and said intermediate member engagably moves on said internal surface of said cylindrical casing so as to drive said cylindrical casing when said drive shaft is rotating faster than said driven shaft in either of two rotational directions, and whereby said intermediate rotary member freely rotates on said cylindrical support portion of said inner member when said driven shaft is rotating faster than said drive shaft, so that said drive shaft is not driven by said driven shaft.

2. The vehicle as claimed in claim 1, wherein said cylindrical casing is formed therein with a number of internal teeth, and said intermediate rotary member is an inscribed gear formed thereon with a number of external teeth in meshing engagement with the internal teeth of said casing.

3. The vehicle as claimed in claim 2, wherein said means for maintaining the engagement of said rotary member with the internal surface of said casing further includes a separator having an annular flange rotatably carried by the eccentric cylindrical support portion of said inner member, wherein said guide portion of semi-circular cross-section extends perpendicularly from an outer periphery of said annular flange to maintain the meshing engagement of said external teeth with said internal teeth at their other portions.

4. The vehicle as claimed in claim 1 wherein the semi-circular cross section of said guide portion is substantially symmetric with a line passing through the central axis of the drive shaft and the central axis of the eccentric cylindrical support portion.

* * * * *